(12) United States Patent
Yamaguchi et al.

(10) Patent No.: US 12,354,330 B2
(45) Date of Patent: Jul. 8, 2025

(54) INFORMATION PROCESSING METHOD, INFORMATION PROCESSING APPARATUS, AND PROGRAM FOR SELECTING IMAGES FOR MACHINE LEARNING FOR SELF DRIVING

(71) Applicant: Panasonic Intellectual Property Corporation of America, Torrance, CA (US)

(72) Inventors: Takuya Yamaguchi, Osaka (JP); Kazunobu Ishikawa, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 1227 days.

(21) Appl. No.: 16/214,557

(22) Filed: Dec. 10, 2018

(65) Prior Publication Data

US 2019/0188599 A1    Jun. 20, 2019

Related U.S. Application Data

(60) Provisional application No. 62/598,745, filed on Dec. 14, 2017.

(30) Foreign Application Priority Data

Jul. 25, 2018    (JP) .................... 2018-139709

(51) Int. Cl.
*G06V 20/56*    (2022.01)
*G06F 18/21*    (2023.01)
(Continued)

(52) U.S. Cl.
CPC .......... *G06V 10/772* (2022.01); *G06F 18/214* (2023.01); *G06F 18/217* (2023.01);
(Continued)

(58) Field of Classification Search
CPC ...... G06N 20/00; G06N 5/048; G06K 9/6255; G06K 9/6256; G06K 9/6262;
(Continued)

(56) References Cited

U.S. PATENT DOCUMENTS

| 2008/0077326 | A1* | 3/2008 | Funk | G01S 19/49 |
| | | | | 701/500 |
| 2010/0149424 | A1* | 6/2010 | Yoon | H04N 19/176 |
| | | | | 348/700 |

(Continued)

FOREIGN PATENT DOCUMENTS

| EP | 1 876 411 | 1/2008 |
| JP | 11-27657 | 1/1999 |

(Continued)

OTHER PUBLICATIONS

Piao ("Adaptive Monocular Visual-Inertial SLAM for Real-Time Augmented Reality Applications in Mobile Devices") Sensors 2017, 17, 2567; doi:10.3390/s17112567 (Year: 2017).*

(Continued)

*Primary Examiner* — Andrew J Jung
*Assistant Examiner* — Su-Ting Chuang
(74) *Attorney, Agent, or Firm* — Wenderoth, Lind & Ponack, L.L.P.

(57) ABSTRACT

Provided are an information processing method, an information processing apparatus, and a program that can increase a diversity of learning data for configurations or techniques of unspecified devices. The information processing method includes: obtaining sensor data obtained by a sensor installed in a vehicle, and at least one type of traveling data of the vehicle; associating the sensor data and the at least one type of traveling data with each other; determining a degree of difference of the at least one type of traveling data from the at least one type of one or more (Continued)

traveling data associated with one or more sensor data; and selecting the sensor data as learning data according to the degree of difference.

9 Claims, 11 Drawing Sheets

(51) Int. Cl.
| | |
|---|---|
| G06F 18/214 | (2023.01) |
| G06F 18/25 | (2023.01) |
| G06F 18/28 | (2023.01) |
| G06N 5/048 | (2023.01) |
| G06N 20/00 | (2019.01) |
| G06V 10/772 | (2022.01) |
| G06V 10/774 | (2022.01) |
| H04L 67/12 | (2022.01) |

(52) U.S. Cl.
CPC ............ *G06F 18/251* (2023.01); *G06F 18/28* (2023.01); *G06N 5/048* (2013.01); *G06N 20/00* (2019.01); *G06V 10/774* (2022.01); *G06V 20/56* (2022.01); *H04L 67/12* (2013.01)

(58) Field of Classification Search
CPC .... G06K 9/6289; G06V 20/56; G06V 10/774; G06V 10/772; H04L 67/12
See application file for complete search history.

(56) References Cited

U.S. PATENT DOCUMENTS

| | | | |
|---|---|---|---|
| 2014/0072169 A1* | 3/2014 | Haas | ......................... G06T 7/74 |
| | | | 382/103 |
| 2017/0279947 A1* | 9/2017 | Rajakarunanayake | . H04W 8/22 |

FOREIGN PATENT DOCUMENTS

| | | |
|---|---|---|
| JP | 2011-71642 | 4/2011 |
| JP | 2016-173682 | 9/2016 |

OTHER PUBLICATIONS

Chen ("Glimpse: Continuous, real-time object recognition on mobile devices") SenSys'15, Nov. 1-4, 2015, Seoul, South Korea (Year: 2015).*

Zhang ("An Automatic Three-Dimensional Scene Reconstruction System Using Crowdsourced Geo-Tagged Videos") EEE Transactions on Industrial Electronics, vol. 62, No. 9, Sep. 2015 (Year: 2015).*

Li ("Integrating intensity and texture differences for robust change detection") IEEE Transactions on Image Processing, vol. 11, No. 2, Feb. 2002 (Year: 2002).*

Chrysos ("PD2T: Person-Specific Detection, Deformable Tracking") 2017—europepmc.org IEEE Transactions on Pattern Analysis and Machine Intelligence, Nov. 3, 2017, 40(11):2555-2568 (Year: 2017).*

Torralba ("LabelMe: Online Image Annotation and Applications") Proceedings of the IEEE ( vol. 98, Issue: 8, Aug. 2010) (Year: 2010).*

Oskiper ("Multi-sensor navigation algorithm using monocular camera, IMU and GPS for large scale augmented reality") 2012 IEEE International Symposium on Mixed and Augmented Reality (ISMAR) (Year: 2012).*

Extended European Search Report issued May 10, 2019 in corresponding European Patent Application No. 18211072.6.

Norimichi Ukita, Detailed explanation, Basic research, "Selection of learning samples for effective learning in human body posture estimation", Image Laboratory, vol. 25, No. 7, Japan, Japan Industrial Publishing Co., Ltd., 2014, with partial English translation.

* cited by examiner

FIG. 7

| IMAGE DATA | TRAVELING DATA | | |
|---|---|---|---|
| | TIME | LOCATION | CAN DATA |
| IMAGE DATA I1 | TIMING t4 | LOCATION INFORMATION P2 | CAN DATA D1 |
| IMAGE DATA I2 | TIMING t7 | LOCATION INFORMATION P3 | CAN DATA D2 |
| IMAGE DATA I3 | TIMING t11 | LOCATION INFORMATION P5 | CAN DATA D5 |
| ⋮ | ⋮ | ⋮ | ⋮ |

INFORMATION PROCESSING METHOD, INFORMATION PROCESSING APPARATUS, AND PROGRAM FOR SELECTING IMAGES FOR MACHINE LEARNING FOR SELF DRIVING

CROSS REFERENCE TO RELATED APPLICATION

This application claims the benefit of priority of U.S. Provisional Patent Application No. 62/598,745 filed on Dec. 14, 2017, and the benefit of priority of Japanese Patent Application Number 2018-139709 filed on Jul. 25, 2018, the entire contents of which is hereby incorporated by reference.

BACKGROUND

1. Technical Field

The present disclosure relates to information processing methods, information processing apparatuses, and programs for selecting sensor data as learning data.

2. Description of the Related Art

Patent Literature (PTL) 1 (Japanese Unexamined Patent Application Publication No. 2016-173682) discloses an error determination device that causes a selector or a learning agent to select information for learning from among image data each having an obtained detection value greater than or equal to a predetermined threshold value.

SUMMARY

However, in PTL 1, since detection values of a specific error determination device are used, data effective for learning in the specific error determination device are selected. Accordingly, the technique of PTL 1 cannot always ensure a diversity of learning data for configurations or techniques of unspecified devices.

In view of this, the present disclosure has an object to provide an information processing method, an information processing apparatus, and a program that can increase a diversity of learning data for configurations or techniques of unspecified devices.

An information processing method according to one aspect of the present disclosure includes the following executed by a computer: obtaining sensor data obtained by a sensor installed in a vehicle, and at least one type of traveling data of the vehicle; associating the sensor data and the at least one type of traveling data with each other; determining a degree of difference of the at least one type of traveling data from the at least one type of one or more traveling data associated with one or more sensor data; and selecting the sensor data as learning data according to the degree of difference.

Moreover, an information processing method according to another aspect of the present disclosure includes the following executed by a compute: obtaining sensor data obtained by a sensor installed in a vehicle, and at least one type of traveling data of the vehicle; associating the sensor data and the at least one type of traveling data with each other; making a computation model for determining a degree of difference of the at least one type of traveling data from the at least one type of one or more traveling data associated with one or more sensor data; and providing the computation model.

It should be noted that these general or specific aspects may be implemented by a system, a device, an integrated circuit, a computer program, or a computer-readable recording medium such as a CD-ROM, and may be implemented by any combination of a system, a device, an integrated circuit, a computer program, and a recording medium.

An information processing method, an information processing apparatus, and a program according to the present disclosure can increase a diversity of learning data for configurations or techniques of unspecified devices.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 7 is a table illustrating an example of combinations of associated image data and traveling data.

DETAILED DESCRIPTION OF THE EMBODIMENTS

Figure 1:
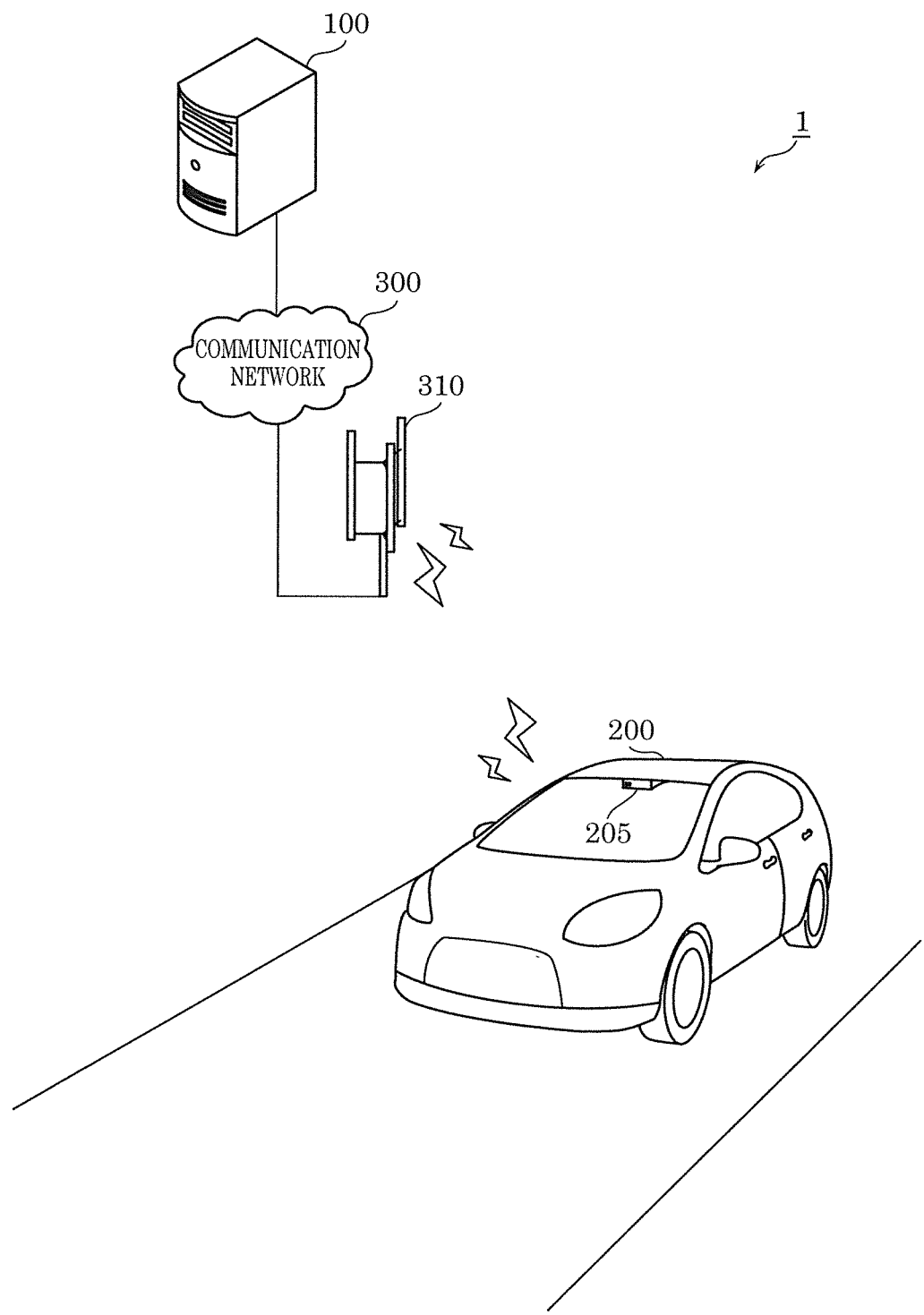
FIG. 1 is a schematic view of an information processing system according to Embodiment 1.

Underlying Knowledge Forming the Basis of the Present Disclosure

In recent years, in the fields of automatic driving, security camera, robot, etc., objection detection using machine learning, such as deep learning for images captured by cameras, has been put into practical use. Such objection detection requires a large volume of teaching data for use in machine learning. For this purpose, myriad images captured by various cameras are collected, and teaching data are generated by humans giving correct interpretations to the collected images.

However, since giving correct interpretations to images by humans is costly, it is undesirable to generate teaching data simply from all obtained myriad images. Besides, even if teaching data are generated by giving correct interpretations to all myriad images without considering costs, machine learning need be executed for the obtained large volume of teaching data. As a result, it takes more processing load and processing time to execute machine learning. Accordingly, for efficient execution of machine learning, it is necessary to select images effective for machine learning from among myriad images.

Here, the myriad images used for machine learning need be made up of images captured in different situations, that is, diverse images. To put it differently, using images captured in different situations is more effective for achieving efficient machine learning than using images captured in similar situations.

As described above, the error determination device narrows down obtained image data to image data each having a detection value based on the image data greater than a predetermined threshold value, and causes a selector or a learning agent to select information for learning from among the narrowed-down image data. In other words, the error determination device uses detection results as selection indices for narrowing down image data to image data for machine learning. As a result, this technique is considered suitable for narrowing down image data to image data effective for machine learning in a specific error determination device.

However, since detection values to be obtained change as configurations or techniques of other devices change, the image data narrowed down to by the error determination device of PTL 1 do not always allow the configurations or techniques of the other devices to achieve efficient machine learning. In other words, with the conventional techniques, it is difficult to select sensor data for execution of efficient machine learning regardless of configurations or techniques of devices, from among a large volume of obtained sensor data.

In order to solve such a problem, an information processing method according to one aspect of the present disclosure includes the following executed by a computer: obtaining sensor data obtained by a sensor installed in a vehicle, and at least one type of traveling data of the vehicle; associating the sensor data and the at least one type of traveling data with each other; determining a degree of difference of the at least one type of traveling data from the at least one type of one or more traveling data associated with one or more sensor data; and selecting the sensor data as learning data according to the degree of difference.

With this, the degree of difference of the at least one type of traveling data from the at least one type of one or more traveling data associated with sensor data already selected as learning data for use in machine learning is determined, and the sensor data associated with the at least one type of traveling data having the determined degree of difference that is greater than or equal to a predetermined threshold value is selected as learning data. For this reason, it is possible to select the sensor data associated with the at least one type of traveling data dissimilar to the at least one type of one or more traveling data associated with the already selected sensor data, and select the sensor data obtained by sensing in a different situation. Accordingly, the above information processing method can increase a diversity of learning data for configurations or techniques of unspecified devices. In other words, it is possible to select sensor data for execution of efficient machine learning regardless of the configurations or techniques of the devices, from among a large volume of obtained sensor data.

Moreover, the information processing method may further include adding, to the one or more traveling data, the at least one type of traveling data associated with the sensor data selected as the learning data.

With this, the at least one type of one or more traveling data is updated, and thus it is possible to appropriately determine a degree of difference of traveling data associated with new sensor data in the determining.

Moreover, in the associating, the sensor data and the at least one type of traveling data obtained when the sensor data is sensed may be associated with each other.

With this, the sensor data is selected as the learning data using the at least one type of traveling data obtained when the sensor data is sensed, and thus it is possible to more accurately select the sensor data for the execution of efficient machine learning.

Moreover, the at least one type of traveling data may include at least two types of traveling data, and in the selecting, the sensor data may be selected as the learning data according to the degree of difference determined using the at least two types of traveling data.

With this, the sensor data for executing machine learning is selected using the at least two types of traveling, and thus it is possible to more accurately select the sensor data for the execution of the efficient machine learning.

Moreover, in the determining, the degree of difference may be determined using a combination of the at least two types of traveling data, and in the selecting, the sensor data may be selected as the learning data according to the degree of difference determined using the combination.

Moreover, in the determining, the degree of difference may be determined for each of the at least two types of traveling data, using the at least two types of traveling data, and in the selecting, the sensor data may be selected as the learning data according to the at least two degrees of difference determined respectively for the at least two types of traveling data.

Moreover, in the selecting, the at least two degrees of difference may be integrated, and the sensor data is selected as the learning data according to a result of the integration.

Moreover, in the determining, the degree of difference may be determined according to weight given to each of the at least two types of traveling data, using the at least two types of traveling data.

Moreover, in the selecting, the sensor data associated with the at least one type of traveling data may be selected as the learning data, the at least one type of traveling data having the degree of difference that is greater than or equal to a predetermined threshold value.

Moreover, the at least one type of traveling data may include any one of a location, time, weather, temperature, a traveling state, traveling speed, traveling control, and a driver attribute.

Moreover, the sensor may be an optical sensor.

Moreover, the information processing method may further include normalizing the at least one type of traveling data, and in the determining, the degree of difference may be determined using the at least one type of traveling data normalized.

Moreover, an information processing method according to another aspect of the present disclosure includes the following executed by a compute: obtaining sensor data obtained by a sensor installed in a vehicle, and at least one type of traveling data of the vehicle; associating the sensor data and the at least one type of traveling data with each other; making a computation model for determining a degree of difference of the at least one type of traveling data from the at least one type of one or more traveling data associated with one or more sensor data; and providing the computation model.

It should be noted that these general or specific aspects may be implemented by a system, a device, an integrated circuit, a computer program, or a computer-readable recording medium such as a CD-ROM, and may be implemented by any combination of a system, a device, an integrated circuit, a computer program, and a recording medium.

Hereinafter, an information processing method, an information processing apparatus, and a program according to one aspect of the present disclosure will be described in detail with reference to the drawings.

It should be noted that each of embodiments to be described below shows a specific example of the present disclosure. The numerical values, shapes, materials, structural components, the arrangement and connection of the structural components, steps, the processing order of the steps, etc. shown in the following embodiments are mere examples, and are not intended to limit the scope of the present disclosure. Furthermore, among the structural components in the following embodiments, components not recited in any of the independent claims which indicate the broadest concepts are described as optional structural components.

Embodiment 1

Hereinafter, Embodiment 1 will be described with reference to FIG. 1 to FIG. 9.

1-1. Configuration

FIG. 1 is a schematic view of an information processing system according to Embodiment 1.

Specifically, FIG. 1 shows information processing apparatus 100, vehicle 200, communication network 300, and base station 310 for mobile communication system. For example, information processing system 1 includes, among these structural components, information processing apparatus 100 and vehicle 200. It should be noted that FIG. 1 shows one vehicle 200, but there may be two or more vehicles 200 or at least one vehicle 100.

Information processing apparatus 100 obtains images captured by camera 205 of vehicle 200, and selects learning data for machine learning from among the obtained images. Information processing apparatus 100 is, for example, a server.

Vehicle 200 includes camera 205 and drives itself or assists with driving according to the results of object detection obtained using images captured by camera 205.

Communication network 300 may be a general-purpose network, such as the Internet, or a special-purpose network. Base station 310 is, for example, a base station used in a mobile communication system such as the third generation mobile communication system (3G), the fourth generation mobile communication system (4G), or Long Term Evolution (LTE) (registered trademark).

Figure 2:
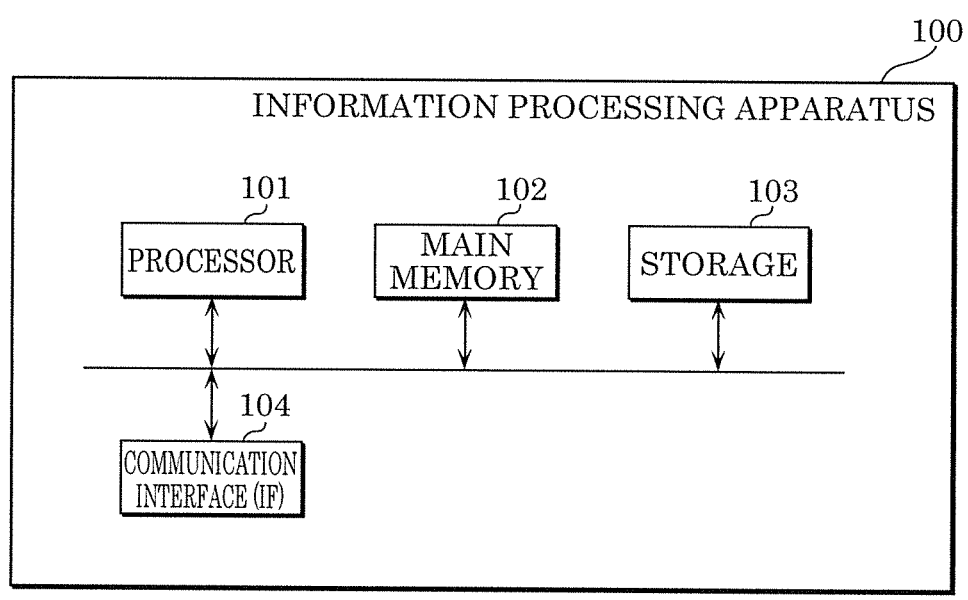
FIG. 2 is a block diagram illustrating an example of a hardware configuration of an information processing apparatus according to Embodiment 1.

Next, the following describes a specific example of a hardware configuration of information processing apparatus 100 with reference to FIG. 2.

FIG. 2 is a block diagram illustrating an example of a hardware configuration of an information processing apparatus according to Embodiment 1.

As shown in FIG. 2, information processing apparatus 100 includes, as hardware components, processor 101, main memory 102, storage 103, and communication interface (IF) 104.

Processor 101 executes a control program stored in, for example, storage 103.

Main memory 102 is a volatile storage area used as a work area when processor 101 executes a control program.

Storage 103 is a nonvolatile storage area that holds a control program or various data such as image data and traveling data.

Communication IF 104 communicates with vehicle 200 via communication network 300. Communication IF 104 is, for example, a wired Local Area Network (LAN) interface. It should be noted that communication IF 104 may be a wireless LAN interface. Besides, communication IF 104 is not limited to a LAN interface, and may be any communication interface as long as the communication interface can establish communication connection with a communication network.

Figure 3:
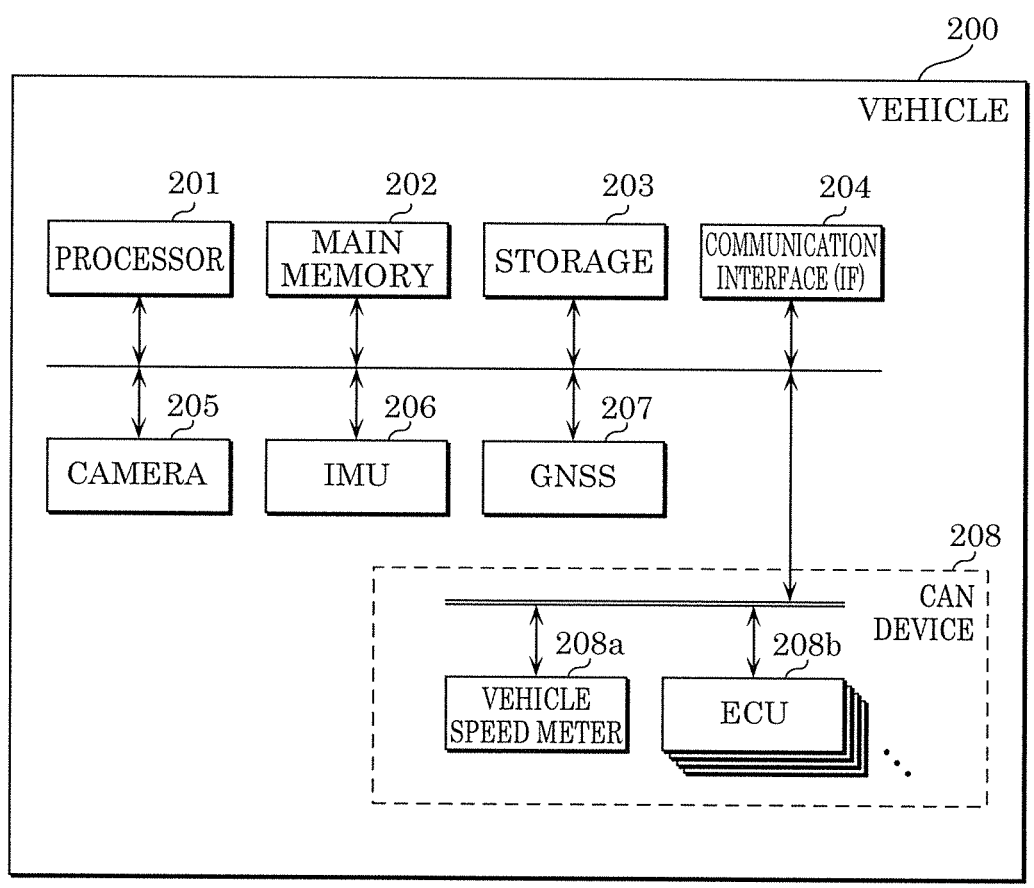
FIG. 3 is a block diagram illustrating an example of a hardware configuration of a vehicle according to Embodiment 1.

Next, the following describes a specific example of a hardware configuration of vehicle 200 with reference to FIG. 3.

FIG. 3 is a block diagram illustrating an example of a hardware configuration of an vehicle according to Embodiment 1.

As shown in FIG. 3, vehicle 200 includes, as hardware components, processor 201, main memory 202, storage 203, communication IF 204, camera 205, inertial measurement unit (IMU) 206, global navigation satellite system (GNSS) 207, and Controller Area Network (CAN) device 208.

Processor 201 executes a control program stored in, for example, storage 203. Processor 201 may include a processor used in an Electronic Control Unit (ECU) for vehicle 200 to drive itself or assist with driving.

Main memory 202 is a volatile storage area used as a work area when processor 201 executes a control program.

Storage 203 is a nonvolatile storage area that holds a control program or various data, such as image data and traveling data.

Communication IF 204 communicates with information processing apparatus 100 via communication network 300. In other words, communication IF 204 may be any communication interface that can establish communication connection with communication network 300. Specifically, communication IF 204 establishes communication connection with communication network 300 by establishing communication connection with base station 310 for mobile communication system. Communication IF 204 may be, for example, a wireless communication interface compliant with the communications standards used in a mobile communication system, such as the third generation mobile communication system (3G), the fourth generation mobile communication system (4G), or LTE (registered trademark). In addition, communication IF 204 may be a wireless local area network (LAN) interface compliant with, for example, IEEE 802.11a, 802.11b, 802.11g, 802.11n, and 802.11ac standards, and may be a communication interface that establishes communication connection with communication network 300 by establishing communication connection with a router not shown (e.g., a mobile wireless LAN router).

Camera 205 is an optical sensor including an optical system, such as a lens, and an image sensor, and is an example of a sensor installed in vehicle 200.

IMU 206 is a sensor device including an acceleration sensor and a gyroscope sensor. The acceleration sensor measures acceleration of vehicle 200 in each of three different directions. The gyroscope sensor measures angular velocity of vehicle 200 at which a rotation is made about each of three axes that are the three different directions.

GNSS 207 receives information indicating a position of GNSS 207 from an artificial satellite, such as a global positioning system (GPS) satellite. In other words, GNSS 207 detects a current location of vehicle 200.

CAN device 208 includes vehicle speed meter 208a that measures the traveling speed of vehicle 200, and electronic control units (ECUs) 208b that control or monitor various devices included in vehicle 200. CAN device 208 may include the above various devices. The various devices controlled by ECUs 208b are, for example, an engine, steering, a brake, an accelerator, and a shift lever, and measure CAN data.

Figure 4:
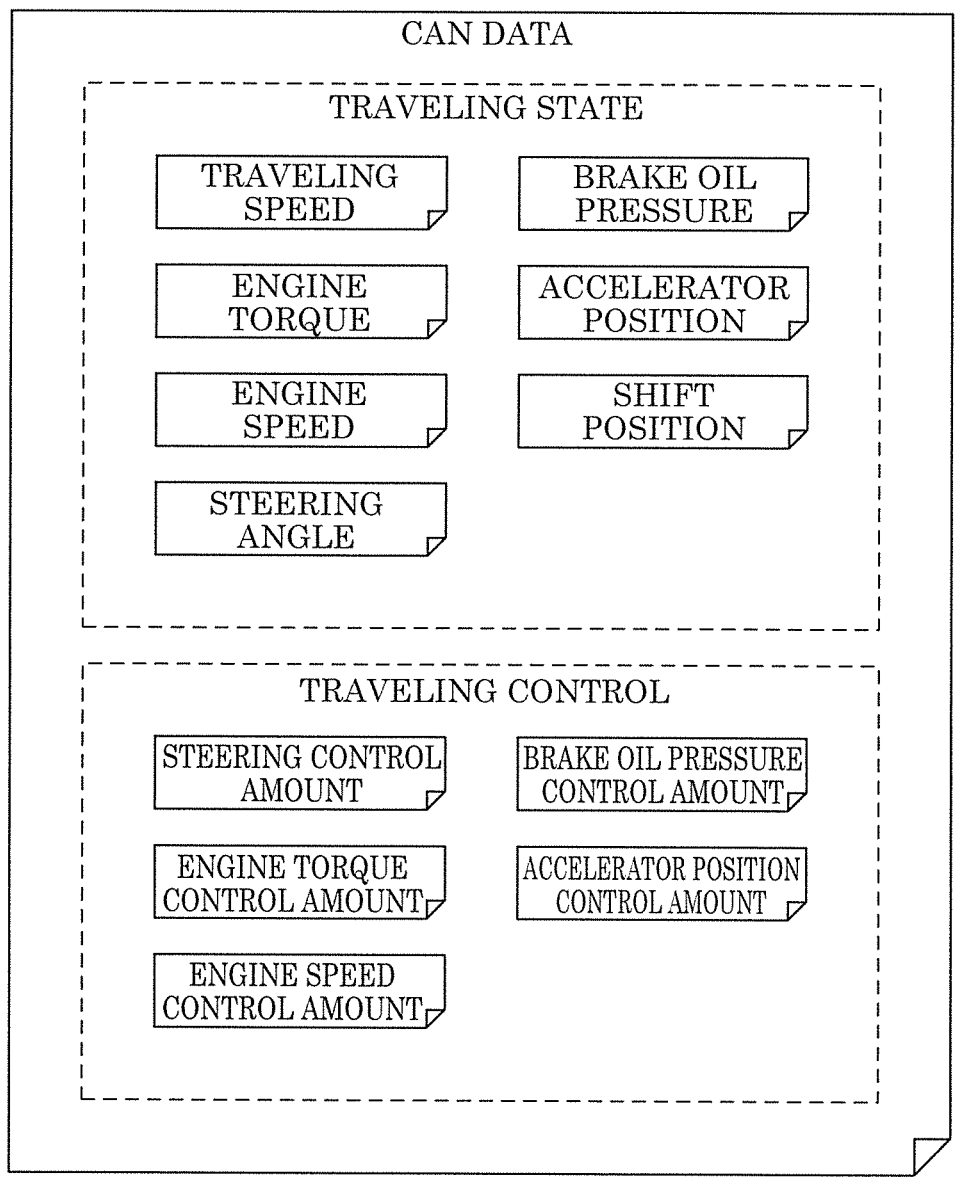
FIG. 4 is a diagram illustrating an example of CAN (Controller Area Network) data.

FIG. 4 is a diagram illustrating an example of CAN data.

CAN data indicates traveling states of vehicle 200, such as a traveling speed, an engine torque, a steering angle of steering, a brake oil pressure, an accelerator position, and a shift position, or traveling control, such as a steering control amount, an engine torque control amount, an engine speed control amount, a brake oil pressure control amount, and an accelerator position control amount.

Figure 5:
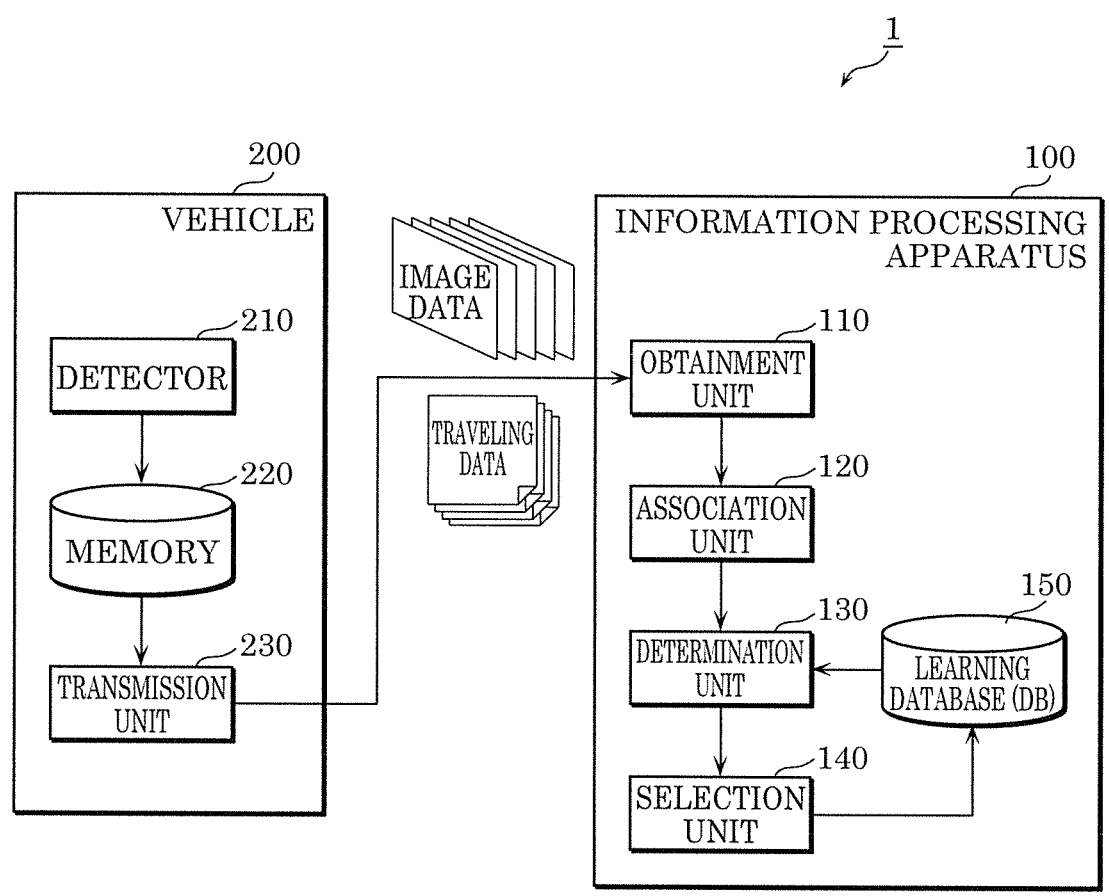
FIG. 5 is a block diagram illustrating an example of a functional configuration of the information processing system according to Embodiment 1.

Next, the following describes a functional configuration of information processing system 1 with reference to FIG. 5.

FIG. 5 is a block diagram illustrating an example of a functional configuration of the information processing system according to Embodiment 1. It should be noted that communication network 300 and base station 310 in FIG. 1 are omitted from FIG. 5

First, the following describes a functional configuration of vehicle 200.

Vehicle 200 includes, as functional components, detector 210, memory 220, and transmission unit 230

Detector 210 detects image data as sensor data of vehicle 200, and traveling data of vehicle 200.

Detector 210 detects image data at different timings. For example, the image data indicate moving images or still images obtained through capture by camera 205.

Detector 210 detects traveling data at different timings. The traveling data comprise at least one type of data, and include, for example, one of a location, a traveling speed, traveling states, and traveling control. The location in the traveling data indicates a location of vehicle 200 detected by GNSS 207. The traveling speed in the traveling data indicates a traveling speed of vehicle 200 detected by vehicle speed meter 208a. It should be noted that a traveling speed may be calculated with a detection value of IMU 206, and may be calculated with a detection value of vehicle speed meter 208a and a detection value of IMU 206. The traveling states in the traveling data indicate traveling states of vehicle 200 detected by ECUs 208b. As stated above, examples of the traveling states include a traveling speed, an engine torque, a steering angle of steering, a brake oil pressure, an accelerator position, and a shift position. The traveling control in the traveling data may indicate a control amount that is based on control of vehicle 200 by a driver and that is for controlling each device related to traveling of vehicle 200, and may indicate an amount of control in processor 201 for controlling related to traveling of vehicle 200 enabled by automatic driving or drive assist. As stated above, the traveling control indicates, for example, a steering angle control amount, an engine torque control amount, an engine speed control amount, a brake oil pressure control amount, and an accelerator position control amount. These control amounts are detected from, for example, respective ECUs 208b.

Regarding the image data, detector 210 stores into memory 220 frames included in the image data or still images and capturing timings that are times when the frames or still images are captured in association with each other. Besides, regarding the at least one type of traveling data, detector 210 stores into memory 220 traveling data detected for respective types and detection timings that are times when the traveling data are detected in association with each other.

It should be noted that detector 210 may detect, as traveling data, time, weather, temperature such as outdoor temperature, outdoor humidity, a driver attribute of a driver in vehicle 200, etc.

The time in the traveling data may be a time when traveling data is detected, and may indicate a time period that includes the time. Time periods may be classified as, for example, dawn, daytime, and nighttime, and the classifications may change according to periods of year such as summertime, wintertime, and an interim period.

The weather in the traveling data indicates weather at a current location of vehicle 200. Detector 210 may detect weather by analyzing images captured by camera 205, and may detect weather by retrieving weather of an area including a location of vehicle 200 at a time from an external server including weather information, according to the time and location.

The driver attribute in the traveling data is information indicating an attribute of the driver driving vehicle 200, and is, for example, information indicating the gender, age, etc. of the driver. Detector 210 may detect a driver attribute by causing the driver to register the driver attribute with vehicle 200 in advance or by communicating with a terminal, such as a smartphone of the driver. It should be noted that once detector 210 detects a driver attribute, detector 210 need not repeatedly detect a driver attribute at timings until detector 210 detects a new driver attribute.

Detector 210 is implemented by, for example, camera 205, IMU 206, GNSS 207, vehicle speed meter 208a, and ECUs 208b.

Memory 220 stores image data detected by detector 210 together with capturing timings of the respective image data. In addition, memory 220 stores traveling data detected by detector 210 together with detection timings of the respective traveling data. Memory 220 is implemented by, for example, storage 203.

Transmission unit 230 transmits image data and traveling data stored in memory 220 to information processing apparatus 100. Transmission unit 230 may transmit image data and traveling data detected by detector 210 to information processing apparatus 100 on a regular basis, such as every day and every week. Moreover, for example, when vehicle 200 is in a parking space of vehicle 200, such as the house of the driver, transmission unit 230 may transmit, to information processing apparatus 100, image data and traveling data obtained when vehicle 200 was traveling until vehicle 200 was parked in the parking space. Furthermore, at this moment, when there are still image data and traveling data that have not been transmitted to information processing apparatus 100, transmission unit 230 may transmit these image data and travelling data to information processing apparatus 100.

Transmission unit 230 is implemented by, for example, processor 201, main memory 202, storage 203, and communication IF 204.

Next, the following describes a functional configuration of information processing apparatus 100.

Information processing apparatus 100 includes, as functional components, obtainment unit 110, association unit 120, determination unit 130, and selection unit 140. Information processing apparatus 100 may further include learning database (DB) 150.

Obtainment unit 110 obtains image data as sensor data obtained by camera 205 installed in vehicle 200, and at least one type of traveling data of vehicle 200. Obtainment unit 110 obtains image data and at least one type of traveling data from vehicle 200. Obtainment unit 110 is implemented by, for example, processor 101, main memory 102, storage 103, and communication IF 104.

Association unit 120 associates the image data and at least one type of traveling data obtained by obtainment unit 110. Association unit 120 associates image data with at least one type of traveling data at a time of capturing the image data.

Figure 6:
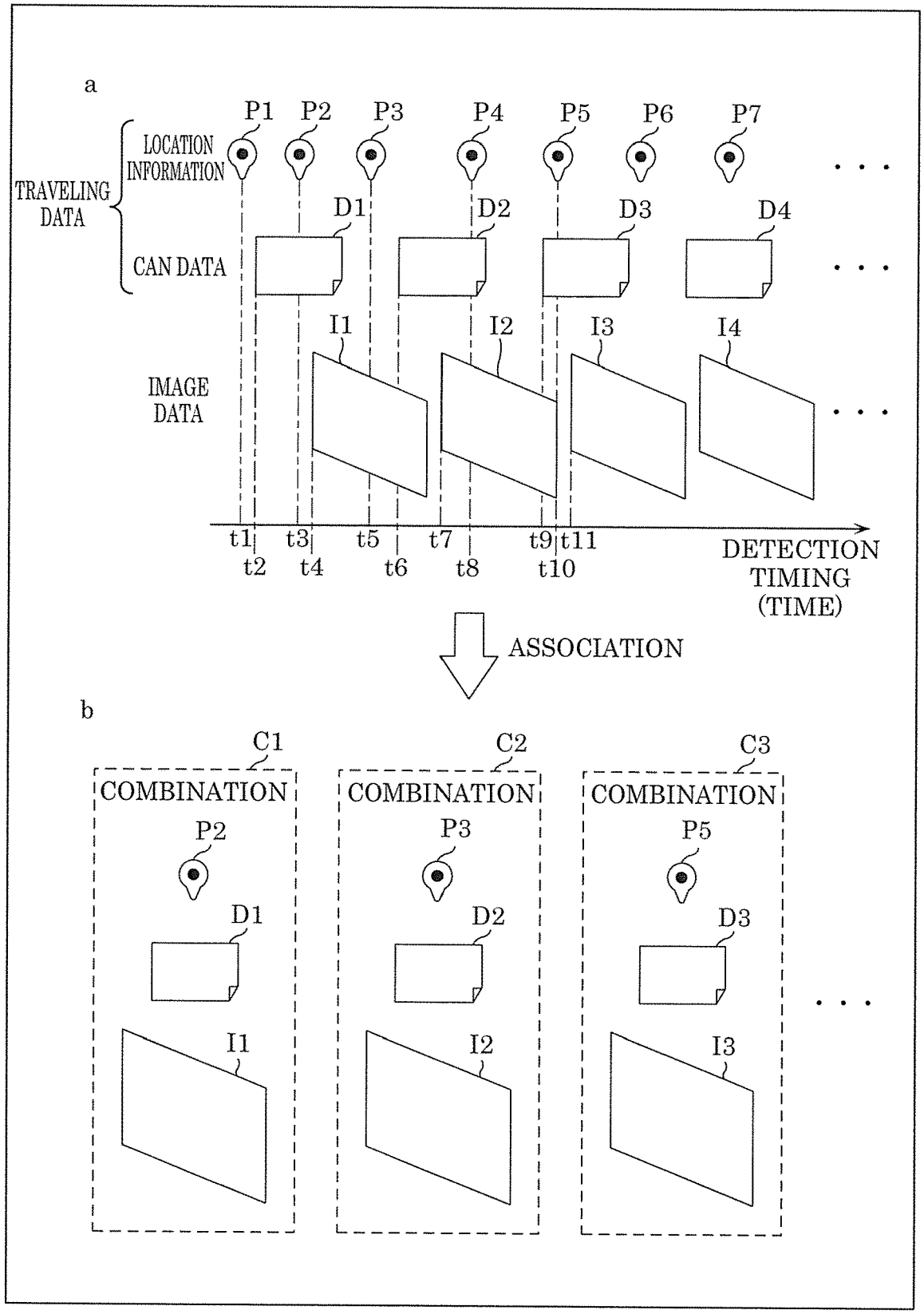
FIG. 6 is a diagram for illustrating an association between image data and traveling data by an association unit of the information processing apparatus.

FIG. 6 is a diagram for illustrating an association between image data and traveling data by an association unit of the information processing apparatus. In a in FIG. 6, shown is an example of detection timings for traveling data including location information and CAN data, and capturing timings for image data. In b in FIG. 6, shown is an example of combinations (sets) each comprising a different one of the image data and a different one of the traveling data associated with the different one image data which are detected at the respective timings shown in a in FIG. 6, in a relationship between the image data and the traveling data.

As shown in a in FIG. 6, location information P1 to P7, CAN data D1 to D4, and image data I1 to I4 are detected at different first timings, different second timings, and different third timings, respectively. GNSS 207 that detects location information P1 to P7, CAN device 208 that detects CAN data D1 to D4, and camera 205 that captures image data I1 to I4 do not generally perform detection or capturing in synchronization with each other, and thus the first timings, the second timings, and the third timings are likely to be different timings. In the example of a in FIG. 6, location information P1 to P5 are detected at respective timings t1, t3, t5, t8, and t10, CAN data D1 to D3 are detected at respective timings t2, t6, and t9, and image data I1 to I3 are detected at respective timings t4, t7, and t11. Timings t1 to t11 are all different timings. As stated above, to be exact, there is a time lag between a timing at which image data is captured and a timing at which traveling data is detected.

Accordingly, for example, association unit 120 associates the latest traveling data when image data is captured, with the image data. In other words, association unit 120 associates traveling data detected at the latest timing among traveling data that have been detected until image data is captured, with the image data.

Specifically, association unit 120 associates, with image data I1, location information P2 detected at latest timing t3 among location information that have been detected until timing t4 at which image data I1 is captured, and CAN data D1 detected at latest timing t2 among CAN data that have been detected until timing t4. In consequence, as shown in b in FIG. 6, combination C1 is obtained in which location information P2, CAN data D1, and image data I1 are associated with each other.

Similarly, association unit 120 associates, with image data I2, location information P3 detected at latest timing t5 among location information that have been detected until timing t7 at which image data I2 is captured, and CAN data D2 detected at latest timing t6 among CAN data that have been detected until timing t7. In consequence, as shown in b in FIG. 6, combination C2 is obtained in which location information P3, CAN data D2, and image data I2 are associated with each other.

Similarly, association unit 120 associates, with image data I3, location information P5 detected at latest timing t10 among location information that have been detected until timing t11 at which image data I3 is captured, and CAN data D3 detected at latest timing t9 among CAN data that have been detected until timing t11. In consequence, as shown in b in FIG. 6, combination C3 is obtained in which location information P5, CAN data D3, and image data I3 are associated with each other. Association unit 120 may associate, as traveling data, timings t4, t7, and t11 that are capturing timings for image data I1 to I3, with respective combinations C1 to C3. Accordingly, for example, as shown in FIG. 7, image data and traveling data are associated with each other.

FIG. 7 is a table illustrating an example of combinations of associated image data and traveling data.

It should be noted that although four image data I1 to I4 are shown as image data in a in FIG. 6, the present disclosure is not limited to this. At least five or at most three image data may be captured. Likewise, although seven location information P1 to P7 and four CAN data D1 to D4 are shown as traveling data, at most six or at least eight location information and at most three or at least five CAN data may be detected.

Moreover, although the example in which one data is obtained as CAN data is described in a in FIG. 6, various types of data included in CAN data are detected at different timings for the respective types. For this reason, when multiple types of data are included in CAN data, the multiple types of data may be associated with image data for the respective types in view of the timings at which the multiple types of data are detected. In this association, the latest data when image data is captured is associated with the image data for each of the multiple types of data in CAN data in the same manner as above.

Furthermore, although association unit 120 forms the above association for each of all image data I1 to I4, the present disclosure is not limited to this. Association unit 120 may form the association for each image data representing N (where N is an integer of at least 2) images continuously captured among image data. In other words, association unit 120 may associate traveling data with image data captured at intervals of N−1 images among image data that are chronologically continuous. Accordingly, when a large volume of similar image data is obtained, such as a case in which image data comprise moving images and a time from when one image data is obtained to when the next image data is obtained is a short time like less than a few seconds, image data to be associated with may be narrowed down in advance.

Moreover, although association unit 120 associates the latest traveling data when image data is captured, with the image data, the present disclosure is not limited to this. For example, association unit 120 may associate traveling data detected at a timing closest to a timing at which image data is captured, with the image data. Besides, association unit 120 may associate traveling data first detected after a timing at which image data is captured, with the image data. Further, when GNSS 207, CAN device 208, and camera 205 are performing detection or capturing at a synchronized timing, association unit 120 may associate traveling data detected at a timing when camera 205 captures image data, with the image data.

Learning DB 150 includes other traveling data associated with other image data. The other traveling data are, for example, multiple types of traveling data as described above. Learning DB 150 may or may not include the other image data. The other image data are data already selected as learning data for use in machine learning. The other traveling data are respectively associated with the other image data and detected when the other image data are captured. Here, the other traveling data correspond to the above-described traveling data. It should be noted that an association between the other image data and the other traveling data may be formed through the same processing as in the association formed by association unit 120. It should be noted that learning DB 150 may not include the other traveling data associated with the other image data, and may include another traveling data associated with one image data. Learning DB 150 is stored in, for example, storage 103.

Determination unit 130 determines a degree of difference of multiple types of traveling data obtained by obtainment unit 110, from the other traveling data in learning DB 150, using combinations of the multiple types of traveling data. Determination unit 130 estimates, for example, a multivariate normal distribution that is a normal distribution in which a dimension is set for each type, using data values of multiple types of other traveling data included in learning DB 150. Subsequently, determination unit 130 determines the degree of difference of the multiple types of traveling data obtained by obtainment unit 110, from the other traveling data in learning DB 150, by calculating a Mahalanobis distance of the multiple types of traveling data from the estimated multivariate normal distribution. Although determination unit 130 calculates the Mahalanobis distance as the degree of difference, the present disclosure is not limited to this. When a distribution of degrees, ranks, classifications, or traveling data having a correlation with the Mahalanobis distance is similar to a unique distribution, for example, sums of likelihoods for probability density functions of held traveling data may be determined as a degree of difference. In order to eliminate the influence of magnitude of a value for each type of traveling data, determination unit 130 may normalize the multiple types of traveling data through linear transformation as preprocessing so that the maximum value and the minimum value each become a constant value. Determination unit 130 is implemented by, for example, processor 101, main memory 102, and storage 103.

Although determination unit 130 determines the degree of difference of the multiple types of traveling data obtained by obtainment unit 110, from the other traveling data in learning DB 150, using the combinations of the multiple types of traveling data, the present disclosure is not limited to this. For example, when obtainment unit 110 obtains one type of traveling data, determination unit 130 may determine a degree of difference of the obtained one type of traveling data from the other traveling data in learning DB 150. In this case, determination unit 130 calculates, as the degree of difference, a difference from a standard value, such as a mean value and a median value of corresponding types of traveling data in learning DB 150.

Selection unit 140 selects, as learning data, image data associated with multiple types of traveling data in a combination for which a degree of difference is determined by determination unit 130 using combinations of multiple types of traveling data, according to the degree of difference. For example, selection unit 140 determines whether a Mahalanobis distance calculated as a degree of difference by determination unit 130 is greater than or equal to a predetermined threshold value, and selects, as learning data, image data associated with traveling data of which the degree of difference is greater than or equal to the predetermined threshold value.

Figure 8:
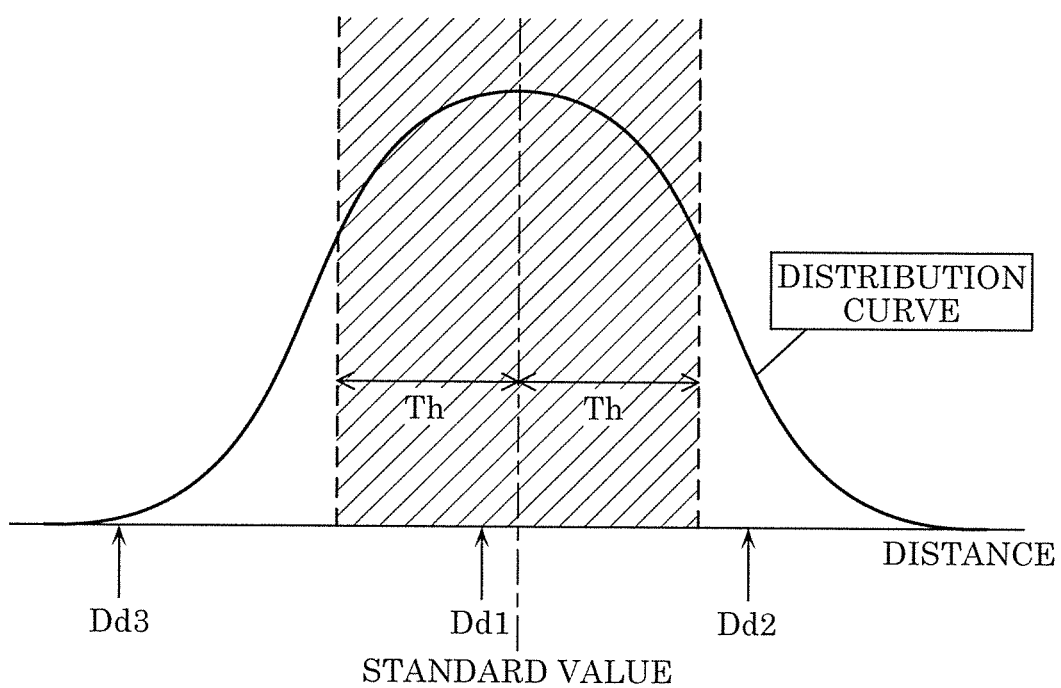
FIG. 8 is a conceptual diagram unidimensionally representing a normal distribution of types of traveling data.

FIG. 8 is a conceptual diagram unidimensionally expressing a normal distribution of types of traveling data.

As shown in FIG. 8, according to a standard value calculated from a distribution curve unidimensionally expressing a normal distribution of multiple types of traveling data, selection unit 140 does not select, as learning data, image data associated with multiple types of traveling data having a degree of difference within a range of predetermined threshold value Th, and selects, as learning data, image data associated with multiple types of traveling data having a degree of difference outside of the range. For example, selection unit 140 does not select, as learning data, image data associated with multiple types of traveling data having degree of difference Dd1 within a range of predetermined threshold value Th, and selects, as learning data, image data associated with multiple types of traveling data having degree of difference Dd2 or Dd3 outside of the range.

Selection unit 140 may add the multiple types of traveling data associated with the image data selected as the learning data, to the other traveling data in learning DB 150. This updates learning DB 150, and thus determination unit 130 can appropriately determine degree of differences of traveling data associated with new image data.

Selection unit 140 is implemented by, for example, processor 101, main memory 102, and storage 103.

It should be noted that image data selected as learning data by information processing apparatus 100 is used as the learning data. For example, teaching data for use in machine learning is generated by giving a correct interpretation to the image data.

1-2. Operation

Next, the following describes operation of information processing system 1 according to Embodiment 1.

Figure 9:
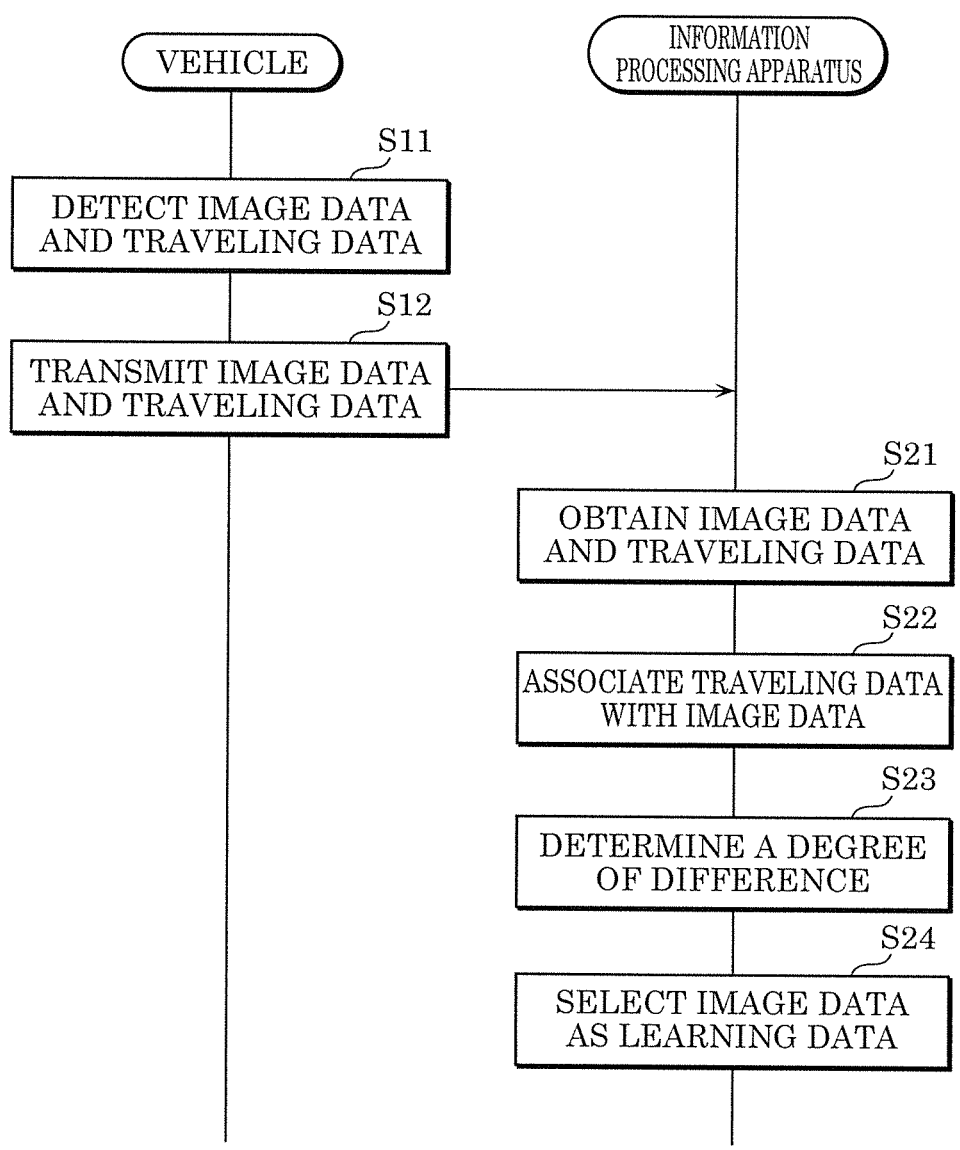
FIG. 9 is a sequence diagram illustrating an example of operation in the information processing system.

FIG. 9 is a sequence diagram illustrating an example of operation in the information processing system.

First, in vehicle 200, detector 210 detects image data as sensor data and multiple types of traveling data at respective timings (S11). The image data and multiple types of traveling data detected by detector 210 are stored into memory 220.

Next, transmission unit 230 of vehicle 200 transmits the image data and multiple types of traveling data stored in memory 220 to information processing apparatus 100 via communication network 300 (S12).

In information processing apparatus 100, obtainment unit 110 obtains the image data and multiple types of traveling data transmitted from vehicle 200 (S21).

Then, association unit 120 of information processing apparatus 100 associates the image data and the multiple types of traveling data (S22).

Next, determination unit 130 of information processing apparatus 100 determines a degree of difference of the multiple types of traveling data (S23).

Subsequently, selection unit 140 of information processing apparatus 100 selects, as learning data, the image data associated with the multiple types of traveling data of which the degree of difference is determined, according to the degree of difference determined by determination unit 130 (S24).

It should be noted that the details of the processes in steps S11, S12, and S21 to S24 performed by the respective processing units are omitted because the details are already given when the functional configuration of vehicle 200 and the functional configuration of information processing apparatus 100 are described with reference to FIG. 5.

1-3. Advantageous Effects, Etc.

The information processing method according to Embodiment 1 includes: obtaining image data obtained by camera 205 installed in vehicle 200, and at least one type of traveling data of vehicle 200; associating the image data and the at least one type of traveling data with each other; determining a degree of difference of the at least one type of traveling data from the at least one type of one or more traveling data associated with one or more image data; and selecting the image data as learning data according to the degree of difference.

With this, the degree of difference of the at least one type of traveling data from the at least one type of one or more traveling data associated with image data already selected as learning data for use in machine learning is determined, and the image data associated with the at least one type of traveling data having the determined degree of difference that is greater than or equal to a predetermined threshold value is selected as learning data. For this reason, it is possible to select the image data associated with the at least one type of traveling data dissimilar to the at least one type of one or more traveling data associated with the already selected image data, and select the image data obtained by capturing in a different situation. Accordingly, the above information processing method can increase a diversity of learning data for configurations or techniques of unspecified devices. In other words, it is possible to select image data for execution of efficient machine learning regardless of the configurations or techniques of the devices, from among a large volume of obtained image data.

Moreover, with the information processing method according to Embodiment 1, the image data is selected as the learning data using the at least one type of traveling data obtained when the image data is captured, and thus it is possible to more accurately select the image data for the execution of the efficient machine learning.

Moreover, with the information processing method according to Embodiment 1, the image data for the execution of the machine learning is selected using the at least two types of traveling data, and thus it is possible to more accurately select the image data for the execution of the efficient machine learning.

Embodiment 2

Next, Embodiment 2 will be described with reference to FIG. 10 and FIG. 11.

Information processing apparatus 100 according to Embodiment 1 is an external server of vehicle 200. The present disclosure, however, is not limited to this, and information processing apparatus 100 may be installed in vehicle 200.

Figure 10:
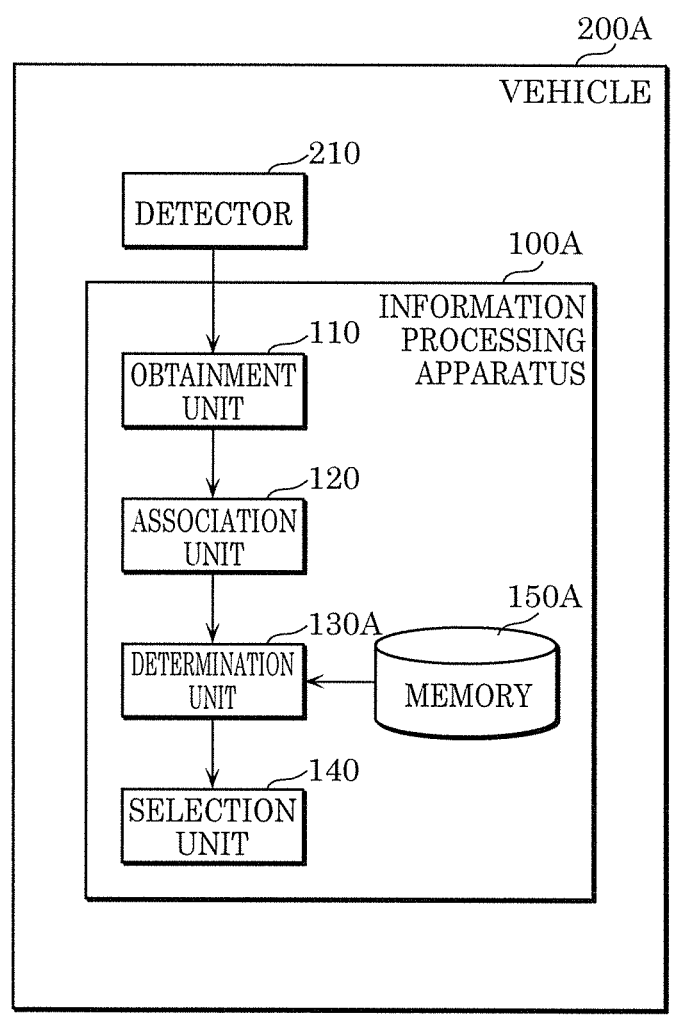
FIG. 10 is a block diagram illustrating an example of a functional configuration of a vehicle according to Embodiment 2.

FIG. 10 is a block diagram illustrating an example of a functional configuration of a vehicle according to Embodiment 2.

As shown in FIG. 10, vehicle 200A includes detector 210 and information processing apparatus 100A. Detector 210 is the same as the one in Embodiment 1, and thus description thereof is omitted.

Information processing apparatus 100A differs from information processing apparatus 100 according to Embodiment 1 in including determination unit 130A and memory 150A. The other components are the same as those of information processing apparatus 100 according to Embodiment 1, and thus description thereof is omitted.

Memory 150A stores information indicating a distribution based on other traveling data associated with image data already selected as learning data for use in machine learning. For example, the distribution is a multivariate normal distribution that is estimated using data values of multiple types of other traveling data and that is a normal distribution in which a dimension is set for each type. It should be noted that the information indicating the above distribution is an example of a computation model for determining a degree of difference.

Determination unit 130A determines a degree of difference of multiple types of traveling data obtained by obtainment unit 110, from the existing other traveling data, by calculating a Mahalanobis distance of the multiple types of traveling data from a multivariate normal distribution indicated in the information stored in memory 150A without estimating the multivariate normal distribution.

Figure 11:
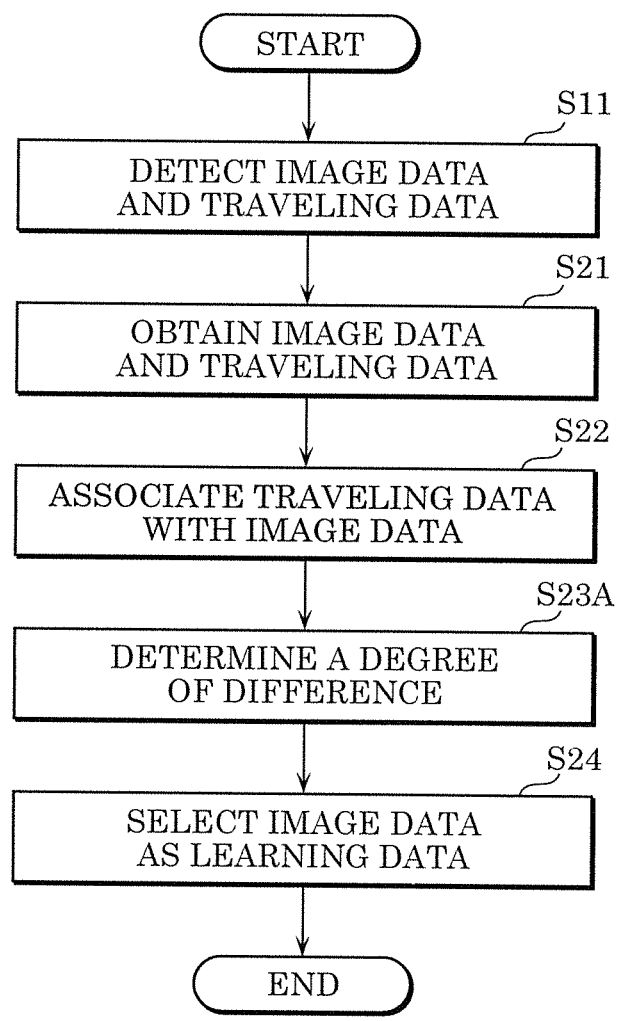
FIG. 11 is a flow chart illustrating an example of operation of the vehicle according to Embodiment 2.

FIG. 11 is a flow chart illustrating an example of operation of the vehicle according to Embodiment 2.

First, in vehicle 200A, detector 210 detects image data as sensor data and multiple types of traveling data at respective timings (S11).

By detector 210 detecting the image data and multiple types of traveling data in step S11, in information processing apparatus 100A, obtainment unit 110 obtains the image data and multiple types of traveling data transmitted from vehicle 200A (S21).

Then, association unit 120 of information processing apparatus 100A associates the image data and the multiple types of traveling data (S22).

Next, determination unit 130A of information processing apparatus 100A determines a degree of difference of the multiple types of traveling data (S23A).

Subsequently, selection unit 140 of information processing apparatus 100A selects, as learning data, the image data associated with the multiple types of traveling data of which the degree of difference is determined, according to the degree of difference determined by determination unit 130 (S24).

It should be noted that the processes in respective steps S11, S21, S22, and S24 are the same as those in Embodiment 1. Besides, the details of the process in step S23A performed by determination unit 130A are omitted because the details are already given when the functional configuration of vehicle 200A are described with reference to FIG. 10.

Information processing apparatus 100A according to Embodiment 2 selects, as learning data, image data from among captured image data in vehicle 200A, and can thus transmit, for example, only the selected image data to an information processing apparatus such as an external server. Accordingly, it is possible to reduce a communication volume from vehicle 200A to an external server, which results in a reduction of communication load.

It should be noted that in information processing apparatus 100A, memory 150A stores the information indicating the distribution based on the other traveling data associated with the image data already selected as the learning data for use in machine learning, but the present disclosure is not limited to this. Information processing apparatus 100A may be configured to obtain the information indicating the above distribution from another information processing apparatus, such as an external server.

In this case, the other information processing apparatus obtains sensor data obtained by a sensor installed in vehicle 200A, and at least one type of traveling data of vehicle 200A; associates the sensor data and the at least one type of traveling data; creates a computation model for determining a degree of difference of the at least one type of traveling data from the at least one type of one or more traveling data associated with one or more sensor data; and provides the created computation model. It should be noted that the obtainment and association of the sensor data and at least one type of traveling data by the other information processing apparatus are the same as those performed by obtainment unit 110 and association unit 120 of information processing apparatus 100 according to Embodiment 1. A computation model for determining a degree of difference may be an average value, a median value, etc. of traveling data for each type, in addition to a distribution based on other traveling data associated with image data already selected as learning data for use in machine learning.

3. Variations

3-1. Variation 1

In information processing apparatus 100 or 100A according to Embodiment 1 or 2, determination unit 130 or 130A determines a degree of difference using a combination of traveling data, but the present disclosure is not limited to this. A degree of difference may be determined for each type using traveling data. In this case, selection unit 140 selects, as learning data, image data according to at least two degrees of difference determined for respective types of traveling data.

Selection unit 140 may compare each of the at least two degrees of difference and a predetermined threshold value, and select, as learning data, image data associated with the traveling data when all of the at least two degrees of difference are greater than the corresponding predetermined threshold value.

Besides, selection unit 140 may integrate at least two degrees of difference and select image data as learning data according to the result of the integration. For example, selection unit 140 may integrate at least two degrees of difference by calculating a total sum, an average value, a median value, etc. of the at least two degrees of difference, and select, as learning data, image data associated with traveling data when the result of the integration is greater than a predetermined threshold value.

Determination unit 130A may determine a degree of difference according to weight given to each of at least two types of traveling data, using the at least two types of traveling data. For example, determination unit 130A may integrate degrees of difference obtained for respective types of traveling data, according to weight predetermined for each of the types of traveling data, and select, as learning data, image data associated with traveling data when the result of the integration is greater than a predetermined threshold value. For example, determination unit 130A may determine a degree of difference according to weight determined in accordance with an index based on a distribution of each traveling data, such as a variance value obtained for each of types of traveling data.

3-2. Variation 2

In information processing apparatus 100 or 100A according to Embodiment 1 or 2, association unit 120 associates image data and multiple types of traveling data, but image data may be associated with one type of traveling data. In this case, the one type of traveling data is one of a location, traveling speed, a traveling state, traveling control, a time, weather, temperature such as outdoor temperature, outdoor humidity, and a driver attribute of a driver in vehicle 200 or 200A.

3-3. Variation 3

Information processing apparatus 100 or 100A according to Embodiment 1 or 2 uses image data as an example of sensor data, but the present disclosure is not limited to this. Detection data obtained by light detection and ranging (LIDAR) may be used. In other words, vehicle 200 may include, instead of camera 205, a LIDAR system that is a type of an optical sensor. Information processing apparatus 100 or 100A may use, as sensor data, both image data and detection data obtained by LIDAR. Besides, detection data obtained by another optical sensor may be used as sensor data.

4. Others

It should be noted that in each of Embodiments 1 and 2, each of the structural components may be configured using dedicated hardware or may be realized by executing a software program suitable for each structural component. Each structural component may be realized by a program execution unit, such as a CPU or a processor, reading and executing a software program recorded on a recording medium such as a hard disk or a semiconductor memory. Here, the software for realizing the information processing method in each of Embodiments 1 and 2 is a program of the type described below.

Specifically, this program causes a computer to execute an information processing method, the information processing method including: obtaining sensor data obtained by a sensor installed in a vehicle, and at least one type of traveling data of the vehicle; associating the sensor data and the at least one type of traveling data with each other; making a computation model for determining a degree of difference of the at least one type of traveling data from the at least one type of one or more traveling data associated with one or more sensor data; and providing the computation model.

Although an information processing method, an information processing apparatus, and a program according to one or more aspects of the present disclosure have been described according to Embodiments 1 and 2, the present disclosure is not limited to Embodiments 1 and 2.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is useful as, for example, an information processing method, an information processing apparatus, and a program that can increase a diversity of learning data for configurations or techniques of unspecified devices.

What is claimed is:

1. An information processing method for selecting learning data for machine learning using an information processing system including a vehicle and a computer connected to the vehicle via a network, wherein the vehicle includes (i) a camera, (ii) a Global Navigation Satellite System (GNSS) receiver, and (iii) a sensor, and wherein the information processing method comprises:
    capturing, by the camera, an image;
    detecting, by the GNSS receiver, a position of the vehicle based on data received from a satellite when the image is captured by the camera;

detecting, by the sensor, a value related to the vehicle when the image is captured by the camera, wherein the value includes (i) a traveling speed of the vehicle, (ii) a torque of an engine of the vehicle, (iii) an engine speed of the engine, (iv) a steering angle of a steering wheel of the vehicle, (v) a brake oil pressure of the vehicle, (vi) an accelerator position of the vehicle or (vii) a traveling state based on a shift lever of the vehicle;

obtaining, by the computer, an image data piece indicating the image captured by the camera from the vehicle via the network;

obtaining, by the computer, a first travelling data piece indicating the position of the vehicle detected by the GNSS receiver from the vehicle via the network when the image is captured by the camera;

obtaining, by the computer, a second traveling data piece including a data piece indicating the value related to the vehicle detected by the sensor from the vehicle via the network when the image is captured by the camera;

associating the obtained image data piece with (i) the obtained first traveling data piece and (ii) the obtained second traveling data piece;

calculating, by the computer, a first distance between the position of the vehicle indicated by the obtained first traveling data piece and a first standard value calculated by a statistical method using two or more positions of the vehicle indicated by two or more first traveling data pieces stored in a storage of the computer, wherein the stored two or more first traveling data pieces are associated with two or more image data pieces stored in the storage;

calculating, by the computer, a second distance between the detected value included in the obtained second traveling data piece and a second standard value calculated by the statistical method using two or more values detected by the sensor and included in the two or more second traveling data pieces stored in the storage, wherein the stored two or more second traveling data pieces are associated with two or more image data pieces stored in the storage;

determining whether or not a degree of difference based on (i) the calculated first distance and (ii) the calculated second distance is greater than or equal to a threshold; and when it is determined that the degree of difference is greater than or equal to the threshold, selecting, the obtained image data piece as learning data for machine learning, the obtained image data piece being associated with (i) the obtained first traveling data piece indicating the position of the vehicle used for the calculating of the first distance and (ii) the obtained second traveling data piece including the detected value used for the calculating of the second distance, wherein the stored two or more image data pieces are data pieces already selected as the learning data, wherein, each of the stored two or more first traveling data pieces is a data piece indicating a position of the vehicle detected by the GNSS receiver when a corresponding one of two or more images included in the stored two or more image data pieces is captured by the camera, and wherein, each of the stored two or more second traveling data pieces includes a data piece indicating a value related to the vehicle detected by the sensor when a corresponding one of the two or more images included in the stored two or more image data pieces is captured by the camera, the vehicle automatically driving itself or assisting with driving utilizing the selected obtained image data piece.

2. The information processing method according to claim 1, further comprising:
adding, by the computer, the obtained first traveling data piece to the stored two or more first traveling data pieces, wherein the obtained first traveling data piece is associated with the obtained image data piece selected as the learning data.

3. The information processing method according to claim 1,
wherein the first distance is a first mahalanobis distance, the second distance is a second mahalanobis distance,
wherein the degree of difference includes (i) a first degree of difference based on the first mahalanobis distance and (ii) a second degree of difference based on the second mahalanobis distance,
the threshold includes a first threshold and a second threshold,
in the determining, it is determined (i) whether or not the first degree of difference is greater than or equal to the first threshold and (ii) whether or not the second degree of difference is greater than or equal to the second threshold, and
in the selecting, the image data piece is selected as the learning data, the image data piece being associated with (i) the obtained first traveling data piece indicating the position of the vehicle used for the calculating of the first mahalanobis distance associated with the first degree of difference which is determined to be greater than or equal to the first threshold and (ii) the obtained second traveling data piece including the detected value used for the calculating of the second mahalanobis distance associated with the second degree of difference which is determined to be greater than or equal to the second threshold.

4. The information processing method according to claim 1,
wherein the degree of difference is (i) a sum of the first mahalanobis distance and the second distance or (ii) an average of the first mahalanobis distance and the second distance.

5. The information processing method according to claim 1,
wherein the determining further includes:
integrating the two degrees of difference according to (i) a first weight given to the obtained first traveling data pieces the stored two or more first traveling data pieces and (ii) a second weight given to the obtained second traveling data pieces and the stored two or more second traveling data pieces, and
wherein the degree of difference is a result of the integrating.

6. The information processing method according to claim 1,
wherein the obtained second traveling data piece further includes a data piece indicating (i) time when the second travelling data piece is obtained, (ii) weather at the position of the vehicle indicated by the obtained first travelling data piece, or (iii) outdoor temperature at the position of the vehicle indicated by the obtained first travelling data piece.

7. The information processing method according to claim 1, further comprising:

normalizing, by the computer, the stored two or more first traveling data pieces,
wherein in the determining, the degree of difference is determined using the stored two or more first traveling data pieces normalized.

8. The information processing method according to claim 1, wherein
the sensor of the vehicle further includes:
a speed meter that detects a traveling speed; and
an electronic control unit (ECU) that monitors a state of the vehicle,
wherein the traveling speed of the vehicle indicated by the value included in the second traveling data piece is detected by one of the speed meter or the electronic control unit (ECU), and
(i) the torque of the engine of the vehicle, (ii) the engine speed of the engine, (iii) the steering angle of the steering wheel of the vehicle, (iv) the brake oil pressure of the vehicle, (v) the accelerator position of the vehicle and (vi) the traveling state based on the shift lever of the vehicle are detected by the ECU.

9. An information processing system that selects learning data for machine learning, the information processing system comprising:
a computer; and
a vehicle connected to the computer via a network,
wherein, the vehicle includes:
a camera that captures an image;
a Global Navigation Satellite System (GNSS) receiver that detects a position of the vehicle based on data received from a satellite when the image is captured by the camera; and
a sensor that detects a value related to the vehicle when the image is captured by the camera, wherein the value includes (i) a traveling speed of the vehicle, (ii) a torque of an engine of the vehicle, (iii) an engine speed of the engine, (iv) a steering angle of a steering wheel of the vehicle, (v) a brake oil pressure of the vehicle, (vi) an accelerator position of the vehicle or (vii) a traveling state based on a shift lever of the vehicle;
wherein, the computer includes:
a processor; and
a memory that stores a computer program,
wherein, when the computer program is executed by the processor, the computer program causes the processor to perform operations including:
obtaining an image data piece indicating the image captured by the camera from the vehicle via the network;
obtaining, from the vehicle via the network, a first travelling data piece indicating the position of the vehicle detected by the GNSS receiver from the vehicle via the network when the image is captured by the camera;
obtaining, by the computer, a second traveling data piece including a data piece indicating the value related to the vehicle detected by the sensor from the vehicle via the network when the image is captured by the camera;
associating the obtained image data piece with (i) the obtained first traveling data piece and (ii) the obtained second traveling data piece;
calculating a first distance between the position of the vehicle indicated by the obtained first traveling data piece and a first standard value calculated by a statistical method using two or more positions of the vehicle indicated by two or more first traveling data pieces stored in a storage of the information processing system, wherein the stored two or more first traveling data pieces are associated with two or more image data pieces stored in the storage;
calculating, by the computer, a second distance between the value included in the obtained second traveling data piece and a second standard value calculated by the statistical method using two or more values detected by the sensor and included in the two or more second traveling data pieces stored in the storage, wherein the stored two or more second traveling data pieces are associated with two or more image data pieces stored in the storage;
determining whether or not a degree of difference based on (i) the calculated first distance and (ii) the calculated second distance is greater than or equal to a threshold; and
when it is determined that the degree of difference is greater than or equal to the threshold, selecting, the obtained image data piece as learning data for machine learning, the obtained image data piece being associated with (i) the obtained first traveling data piece indicating the position of the vehicle used for the calculating of the first distance and (ii) the obtained second traveling data piece including the detected value used for the calculating of the second distance,
wherein, the stored two or more image data pieces are data pieces already selected as the learning data, and
wherein, each of the stored two or more first traveling data pieces is a data piece indicating a position of the vehicle detected by the GNSS receiver when a corresponding one of two or more images included in the stored two or more image data pieces is captured by the camera, and
wherein, each of the stored two or more second traveling data pieces includes a data piece indicating a value related to the vehicle detected by the sensor when a corresponding one of the two or more images included in the stored two or more image data pieces is captured by the camera,
the vehicle automatically driving itself or assisting with driving utilizing the selected obtained image data piece.

* * * * *